S. H. DAILEY.
Wheels and Axles for Vehicles.

No. 152,280.　　　　　　　　　　　Patented June 23, 1874.

WITNESSES:　　　　　　　　　　　INVENTOR:
E. Wolff.　　　　　　　　　　　　S. H. Dailey
Sedgwick.
　　　　　　　　　　　　　　　BY
　　　　　　　　　　　　　　　ATTORNEYS.

UNITED STATES PATENT OFFICE.

SYLVESTER H. DAILEY, OF OLCOTT, NEW YORK.

IMPROVEMENT IN WHEELS AND AXLES FOR VEHICLES.

Specification forming part of Letters Patent No. 152,280, dated June 23, 1874; application filed May 1, 1874.

*To all whom it may concern:*

Figure 1:
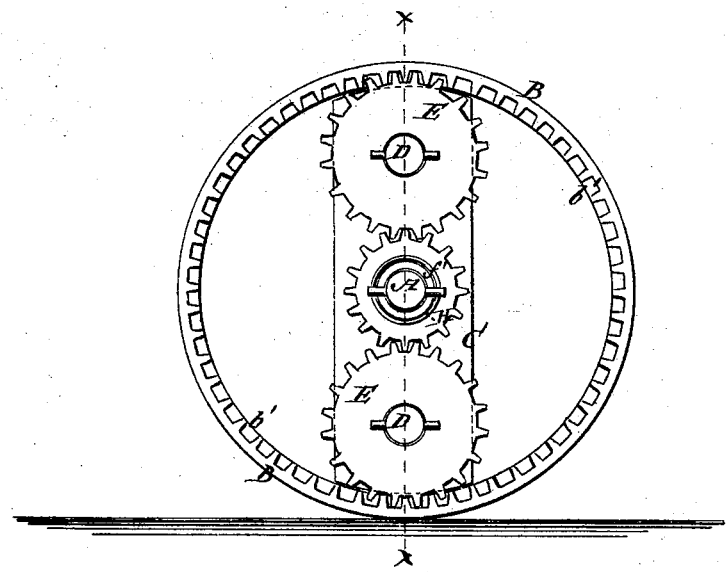
Figure 2:
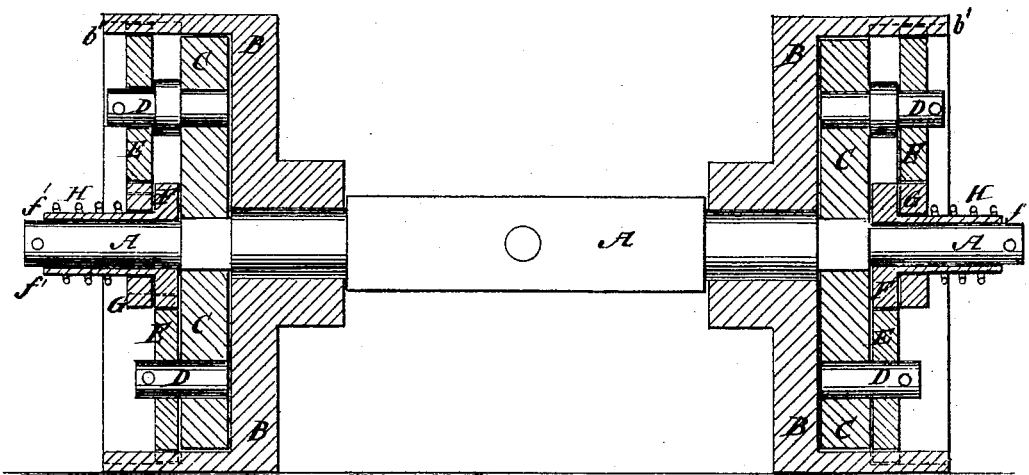

Be it known that I, SYLVESTER H. DAILEY, of Olcott, in the county of Niagara and State of New York, have invented a new and useful Improvement in Wheels and Axle, of which the following is a specification:

Figure 1 is a side view of my improved device, shown as applied to a wheel. Fig. 2 is a vertical section of the same, taken through the line $x$ $x$, Fig. 1.

Similar letters of reference indicate corresponding parts.

My invention has for its object to furnish an improved device for attachment to vehicles, mowing-machines, harvesters, rollers, &c., which will enable them to be drawn with less power than would otherwise be required. The invention consists in the vertical stationary bar, provided with gudgeons, the two gear-wheels, the gear-wheel and sleeve, and the gear-wheel and coiled spring, in combination with the outwardly-projecting toothed rim of the wheels, and with the projecting journals of the axle, as hereinafter fully described.

A represents the axle of the vehicle or machine. B are the wheels, which revolve upon the journals of the axle A, and which are made with wide rims projecting upon the outer sides of the said wheels, and having gear-teeth $b'$ formed upon their inner or concave surfaces. The journals of the axle A project upon the outer sides of the wheels B, and are squared off close to the body of the said wheels, to fit into square holes in the center of the bars C, which are placed in vertical positions, and to the arms of which are attached gudgeons D, upon which revolve gear-wheels E, of a diameter equal to about one-third the diameter of the wheels B. The upper gudgeon D is made longer than the lower one, and has a collar formed upon it of a breadth equal to the thickness of the lower wheel E, as shown in Fig. 2. The teeth of the lower wheel E mesh into a gear-wheel, F, which runs upon the journal of the axle A, and is formed with or is rigidly attached to a sleeve, $f'$, which extends out nearly to the end of the journal of the axle A. Upon the sleeve $f'$, close to the wheel F, is placed a gear-wheel, G, the teeth of which mesh into the teeth of the upper gear-wheel E. H is a spring coiled around the outer part of the sleeve $f'$. One end of the coiled spring H is attached to the gear-wheel G, and its other end is attached to the outer part of the sleeve $f'$.

By this construction, as the vehicle or machine is drawn forward, the draft applied to the axle A will act upon the upper part of the wheels B, so that less power will be required to draw the machine than would be necessary were the wheels constructed in the usual way.

Having thus described my invention, I claim as new and desire to secure by Letters Patent—

The vertical stationary bar C, provided with gudgeons D, the two gear-wheels E, the gear-wheel and sleeve F $f'$, the gear-wheel G, and the coiled spring H, in combination with the outwardly-projecting toothed rim of the wheels B, and with the projecting journals of the axle A, substantially as shown and described.

SYLVESTER H. DAILEY.

Witnesses:
HARVEY E. MATHEWS,
H. E. BRIGGS.